Jan. 15, 1963    C. A. MEYER ET AL    3,073,563
FLUID CONTROL APPARATUS
Filed March 6, 1961
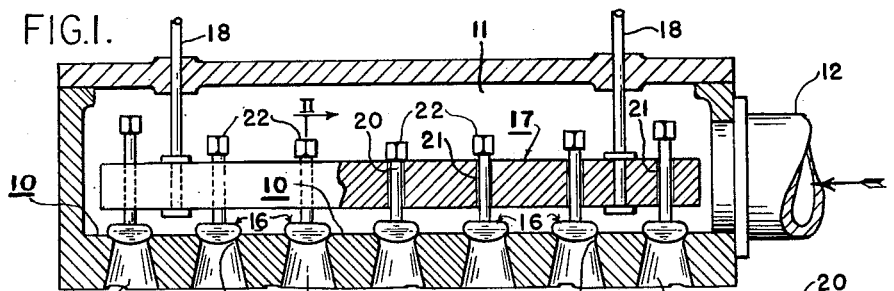
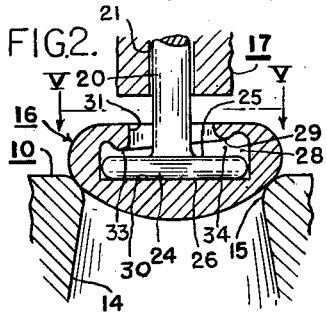
FIG.2.
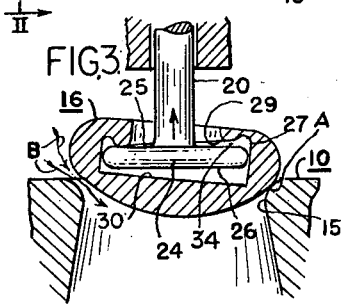
FIG.3.
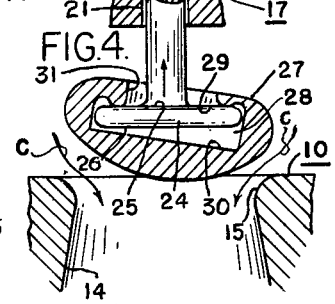
FIG.4.
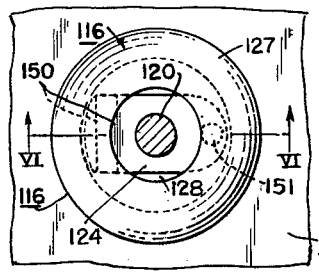
FIG.7.
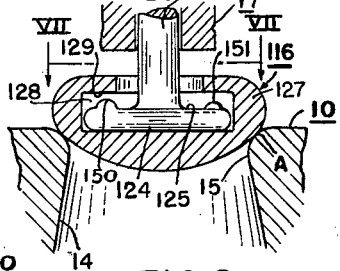
FIG.6.
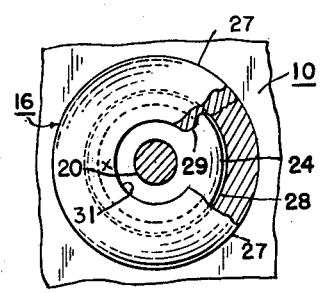
FIG.5.
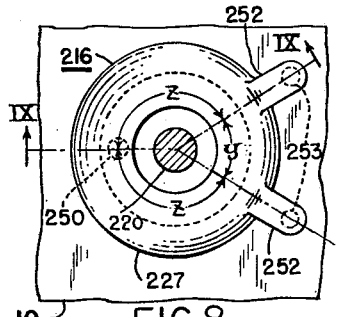
FIG.8.
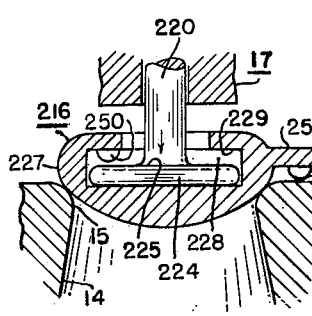
FIG.9.
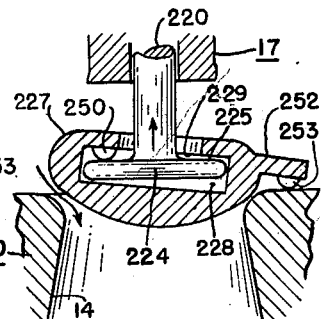
FIG.10.
INVENTORS.
CHARLES A. MEYER
DANIEL D. ROSARD
BY *Frank Cristiano Jr.*

Ｕnited States Patent Office 3,073,563
Patented Jan. 15, 1963

3,073,563
FLUID CONTROL APPARATUS
Charles A. Meyer, Media, and Daniel D. Rosard, Havertown, Pa., assignors to Westinghouse Electric Corporation, East Pittsburgh, Pa., a corporation of Pennsylvania
Filed Mar. 6, 1961, Ser. No. 93,429
6 Claims. (Cl. 251—86)

This invention relates to valve structure for controlling flow of high pressure elastic fluid such as steam and, more particularly, to a valve structure of the above type having improved vibration damping characteristics.

One of the main objects of the invention is to provide a valve structure of the movable head or plug type, wherein the vibration heretofore attained in the movable plug structure is damped in a simple, yet highly effective, manner, especially when the plug structure is opened to a slight degree.

A further object of the invention is to provide a valve structure in which the movable plug structure is maintained in the closed position by the pressure of the elastic fluid and is moved in opening direction against this pressure, and arranged in such a manner that the initial lifting force required to move the plug structure in opening direction is reduced to about fifty percent.

Although the invention may advantageously be employed in many types of valve structures, it is primarily directed to steam flow control valve structure of the type shown and described in K. R. Stearns Patent No. 2,294,636, dated September 1, 1942, and assigned to the same assignee as this invention, and may be employed for controlling flow of steam to a steam turbine. The valve structure shown in the above Stearns patent is suitable for reliably controlling steam flow in the usual pressure and temperature ranges heretofore employed. However, it has been found that, with the higher pressures now being employed, when the valves are partially open the steam flow therepast sometimes induces severe vibration in the valve stems, invariably causing peaning of the various metallic components of the valve structure and, in some instances, even causing breakage of the valve stems.

In accordance with the invention, each valve stem is provided with an enlarged end portion and the valve head or plug is carried by the end portion and disposed in registry with the valve seat. The valve head is of hollow form with internal wall surfaces defining a central cavity communicating with an aperture or smaller cross-sectional area than the cavity, and the end portion of the valve stem is loosely held captive within the cavity. The internal wall surfaces of the cavity include axially spaced upper and lower wall portions which are disposed in abuttable relation with the upper and lower face portions of the enlarged end portion of the valve stem, respectively, and the upper wall portion and the upper face portion are inclined relative to each other or may be provided with a projection, so that when the valve stem is translated in opening direction from a closed position with a rectilinear motion, the valve head is progressively tilted as it is picked up by the stem. Accordingly, a portion of the external surface of the valve head is maintained in contact with the valve seat during the initial opening movement. During the movement of the valve head in the critical zone, wherein vibration has heretofore been induced, the vibration inducing energy of the steam flowing past the valve seat in the partially open position is damped by abutment of the movable valve head with the valve seat, since it is in contact with the relatively large mass of the valve body. As the movable valve member is translated to a more open position, the valve head is lifted out of abutment with the valve seat throughout its entire periphery. However, at this time the valve head is sufficiently removed from the valve seat so that the flow of steam through the valve seat has little, if any, effect upon the movable valve structure.

The invention is susceptible of many embodiments and, in another embodiment, the movable valve head is provided with a pair of externally projecting foot members disposed in abutment with the valve body adjacent the valve seat and acting to provide tilting movement of the movable valve head in the same manner as described above, but with a more clearly defined circular motion about the foot members as a fulcrum.

The above and other objects are effected by the invention as will be apparent from the following description taken in connection with the accompanying drawings, forming a part of this application, in which:

FIG. 1 is a longitudinal sectional view, in diagrammatic form, of a multiple valve structure illustrating the invention;

FIG. 2 is an enlarged fragmentary sectional view taken on line II—II of FIG. 1 and showing one of the valves in the closed position;

FIGS. 3 and 4 are views similar to FIG. 2 but with the valve in different positions;

FIG. 5 is a view taken on line V—V of FIG. 3;

FIGS. 6 and 7 are views similar to FIGS. 2 and 5, respectively, but illustrating another embodiment; and, FIGS. 8, 9 and 10 are views showing a third embodiment.

Referring to the drawing in detail, in FIG. 1 there is shown a body 10 defining a steam chest or chamber 11 having an inlet 12 for admission of high pressure steam thereto and a plurality of outlets 14 for delivery of steam therefrom. Each of the steam outlets 14 is provided with an annular valve seat 15 cooperatively associated with a movable valve structure 16. The valve structures 16 are carried by a lifting bar 17 disposed within the steam chest 11 and provided with a pair of rods 18 extending through the body 10 and connected to an actuating mechanism (not shown).

As well known in the art, each of the movable valve structures 16 is provided with an axially elongated valve stem 20 received in a bore 21 formed in the lifting bar 17. The stems 20 are loosely guided for vertical movement by the bores 21 and are adjusted to various lengths by nuts 22 threadedly received on the upper ends thereof, so that, as the lifting bar 17 is lifted, the valve structures 16 are sequentially moved out of engagement with their associated valve seats 15. Since high pressure steam fills the entire steam chest 11, considerable lifting force is required initially to move the movable valve structures 16 in opening direction from the closed position.

As thus far described, the structure is substantially conventional, and, in operation, the flow of steam from the steam inlet 12 through the outlets 14 is controlled in the sequential manner described above. Accordingly, at all except full load operation, one or more of the valves may be in the closed position while one or more of the remaining valves may be in a slightly open position. The valves disposed in the closed position and the valves disposed in the fully open position are not subject to vibration induced by the steam. However, the valves in the partially open position undergo extreme excitation by the steam flow therepast, thereby causing them to vibrate in a direction transverse to the longitudinal axes of the valve stems 20. This vibration has been noted to wear the bores 21 from a circular cross-sectional shape to an elliptical cross-sectional shape. As the bore is thus enlarged, the valve seats 15 are also deformed by the peaning action of the movable valve structures 16. Since the movable valve structures 16 are supported by the lifting bar 17, when in the partially open position, the adjusting nuts 22 are also vibrated and tend to dig into the lifting bar 17. Although the above phenomena are highly undesirable and adversely affect the operation of the valve structure, as well as the control of steam flowing through the outlets 14, a further and more serious consequence has also been noted, namely, breaking of the valve stems in the region immediately below the lifting bar 17. After such breakage occurs, control of steam flow through the associated outlet 14 is completely lost. That is, failure may occur with the valve dropping to the closed position, thereby blocking further flow therethrough or, on the other hand, such failure may result in dislodgement of the valve so that the fluid outlet 14 permits full flow of the steam at all times.

In accordance with the invention, each of the movable valve structures 16 is formed and arranged in such a manner that the undesirable vibration phenomena described above is substantially eliminated. Since each of the movable valve structures may be identical, only one will be described.

As best shown in FIGS. 2, 3 and 4, the valve stem 20 is formed with an enlarged lower end portion 24 of disc shape having upper and lower parallel faces 25 and 26, respectively. A valve head or plug 27 is carried by the end portion 24 and disposed in registry with the associated valve seat 15. The valve head 27 may be of any suitable external shape. For example, it may be of the mushroom shape shown. The valve head 27 is of hollow form with a central cavity 28 of circular shape defined partially by upper and lower wall portions 29 and 30, respectively, disposed in axially spaced relation with each other to a greater degree than the axial thickness of the end portion 24, so that when the valve is in the closed position shown in FIG. 2, the upper face 25 of the end member 24 is disposed in spaced relation with the upper wall 29 of the valve head. For simplicity of illustration, the upper wall portion 29 has been shown as an integral portion of the valve head 27. However, to facilitate assembly, the portion 29 may be separately formed and attached to the valve head 27 in any suitable manner, such as by threads or welding (not shown). The upper wall 29 and upper face 25 are inclined relative to each other, for example, by forming the upper face 25 perpendicularly to the axis of the valve stem 20 and by inclining the upper wall 29 relative thereto. The valve head 27 is further provided with an aperture 31 of smaller diameter than the cavity 28 so that the valve head 27 is held loosely captive on the enlarged end portion 24 of the valve stem.

As best seen in FIG. 2, when the valve structure is in the seated position, the spacing 33 between the left-hand side of the wall 29 and the upper face 25 is smaller than the spacing 34 between the right-hand portion of the upper wall 29 and the upper face 25. However, as previously explained, the valve head 27 is maintained in seated relation with the valve seat 15 by the steam pressure in the steam chest 11.

During operation, as the movable valve structure 16 is moved upwardly by the lifting bar 17 to permit flow through the steam outlet 14, the enlarged end portion 24 of the valve stem first engages the left-hand portion of the upper wall surface 29 thereby lifting the valve head 27 with a tilting or arcuate motion about the valve seat 15 at point A (FIG. 3) as the center. As the steam starts to flow past the partially open valve seat 15, as indicated by the arrows B, any vibration inducing forces of the steam are absorbed by the body 10, since the valve head 27 is maintained in abutment therewith during this phase of its upward travel.

As the movable valve structure 16 is lifted upwardly to a further degree, as shown in FIG. 4, the movable head 27 is lifted clear of the valve seat 15. However, since steam flow is attained through the valve seat 15 around the entire annular opening defined with the valve head 27, as indicated by the arrows C, any unbalanced transverse forces imposed upon the movable valve head are so small that little or no vibration is induced in the movable valve structure 16.

A second embodiment of the invention comprising a movable valve structure 116 is shown in FIGS. 6 and 7. This arrangement is similar to that shown in FIGS. 1 to 5, inclusive, except as hereinafter described. The movable valve structure 116 includes a valve head 127 loosely held captive by the enlarged end portion 124 of the elongated valve stem 120. The valve head 127 is provided with an internal cavity 128, the upper portion of which is defined by a flat or planar upper wall 129 disposed in axially spaced relation with the upper face 125 of the enlarged end portion 124. The tiltable effect is attained in this embodiment by providing the end portion 124 with an elongated, generally semi-cylindrical projection 150 disposed to the left of the valve stem 120, and a generally hemispherical projection 151 disposed to the right of the stem 120 (as viewed in the figures). The projections 150 and 151 are diametrically opposed, and the projection 150 is of greater height than the projection 151.

The valve structure 116 operates in substantially the same manner as the first embodiment. That is, assuming that the valve structure 116 is initially in the closed position, as shown in FIG. 6, as the valve structure 116 is lifted by the lifting bar 17, the valve stem 120 is moved upwardly and during the initial portion of its travel the projection 150 engages the upper wall 129. Since the projection 150 is semi-cylindrical, the contact between the upper wall 129 and the projection 150 is a line. Further upward movement causes the end portion 124 to lift the valve head 127 upwardly with a tilting motion about the point of contact $a$ between the external surface of the valve head 127 and the valve seat 15, thereby serving to prevent vibration of the components of the valve structure 116. After the valve structure 116 is lifted clear of the valve seat 15, the right-hand portion of the valve head 127 is supported by the projection 151 to further steady the valve head 127 against tilting about an axis transverse to the line of contact between the projection 150 and the upper wall 129 of the valve head.

During operation of the valve structure 116 in closing direction, the above sequence of events is reversed, thereby obviating vibration of the valve structure 116 during interruption of steam flow through the outlet 14.

The embodiment shown in FIGS. 6 and 7 and described above is more stable during valve opening movement than the embodiment shown in FIGS. 1 to 5, inclusive, since the initial lifting of the valve head 127 is attained by line contact with the projection 150. This stability is further enhanced by the spaced point of support provided by the projection 151 after the valve head 127 is lifted clear of the valve seat 15.

In FIGS. 8 to 10, inclusive, there is shown a movable valve structure 216 of further modified form. This valve structure is also generally similar to the first and second embodiments but differs therefrom in the following manner. The valve stem 220 is provided with an enlarged end portion 224 having a flat or planar upper face 225 disposed perpendicularly to the longitudinal axis of the stem 220. The valve head 227 has an internal cavity 228 partially defined by a planar upper wall 229 on which is formed a depending projection 250. The projection 250, as illustrated, is generally hemispherical so that, during the lifting movement, the abutment between the upper face 225 of the end portion and the projection 250 is a point. However, stability is imparted to the valve head 227 during the initial lifting movement by a pair of foot members 252 extending radially outwardly from the valve head 227 and angularly displaced at a suitable central angle Y with respect to the longitudinal axis of the valve stem 220. Each of the foot members 252 is provided with a downwardly extending hemispherical projection 253 disposed in abuttable relation with the body 10 in the region adjacent the associated valve seat 15. The projections 253 are equiangularly disposed with relation to a radial line extending through the projection 250, as indicated by the angle Z.

During operation, as the movable valve structure 216 is initially lifted in opening direction, the end portion 224 is brought into abutment with the projection 250. However, since the two foot projections 253 are in abutment with the body 10, the movable head 227 is lifted with a tilting motion about the projections 253 as the center. The arcuate or tilting movement permits the valve head 227 to be lifted clear of the valve seat 15 while still in contact with the valve body 10 at the points of contact with the projections 253. Hence, the vibration inducing forces of the steam are transmitted to the body 10 by the foot members 252, as illustrated in FIG. 10, and absorbed by the former in a highly effective manner.

It will now be seen that the invention provides a highly improved valve structure for controlling flow of high pressure elastic fluid such as steam with a minimum of vibration induced by the forces of the fluid flowing therepast during opening and closing of the valve structure. In all of the embodiments, the valve head is lifted at one portion while the diametrically opposed portion is maintained in abutting relation with the associated valve seat 15, thereby to suppress vibrations of the valve structure which would otherwise be induced.

Since the valve head is initially moved from the closed position with a tilting or arcuate motion instead of a rectilinear motion, the force heretofore required for lifting the movable valve structure is reduced by fifty percent. This feature, although a secondary feature, is highly desirable in valve structures employed for controlling high pressure elastic fluid, since the pressure of the fluid acts on the valve head to maintain it in the closing position. For example, a valve head having an effective cross-sectional area of one square inch and controlling flow of steam at a pressure of 3500 pounds per square inch would require a lifting force of 3500 pounds to initially move in opening direction with a rectilinear motion. With the invention, the force required to move the valve initially in opening direction would be half of 3500 pounds or 1750 pounds. It can readily be seen that with the multiple valve arrangement such as shown in FIG. 1, wherein seven sequentially movable valve structures are illustrated, a reduction in force of fifty percent would permit employment of a valve actuating mechanism (not shown) having only half the power heretofore required.

While the invention has been shown in several forms, it will be obvious to those skilled in the art that is not so limited, but is susceptible of various other changes and modifications without departing from the spirit thereof.

What is claimed is:

1. In combination, a body having a fluid inlet and a fluid outlet, said body having a chamber communicating with said inlet and said outlet, an annular valve seat disposed in registry with said fluid outlet, a valve structure for controlling fluid flow through said outlet, said valve structure comprising a downwardly extending axially elongated valve stem having an enlarged lower end portion and a valve head carried by said end portion and disposed in registry with said valve seat, and means for guiding said valve structure for rectilinear movement along its longitudinal axis, said valve head being of hollow form and having internal wall surfaces defining a central cavity communicating with an aperture of smaller cross-sectional area than said cavity, the end portion of said valve stem being loosely held captive within said cavity, said internal wall surfaces including axially spaced upper and lower wall portions, said end portion having upper and lower face portions disposed in abuttable relation with said upper and lower wall portions, respectively, and said upper wall portion and said upper face portion being inclined relative to each other when said valve head is seated on said valve seat.

2. In combination, a body having a fluid inlet and a fluid outlet, said body having a chamber communicating with said inlet and said outlet, an annular valve seat disposed in registry with said fluid outlet, a movable valve structure for controlling fluid flow through said outlet, said valve structure comprising a downwardly extending axially elongated valve stem, means for slidably guiding said valve stem, said valve stem having an enlarged lower end portion, and a valve head carried by said end portion and disposed in alignment with said valve seat, means for rectilinearly translating said valve structure along its longitudinal axis, said valve head being of hollow form and having internal wall surfaces defining a central cavity communicating with an aperture of smaller cross-sectional area than said cavity, the end portion of said valve stem being loosely held captive within said cavity, said internal wall surfaces including axially spaced upper and lower walls, said end portion having upper and lower faces disposed in axially spaced relation with said upper and lower walls, respectively, and said upper wall and said upper face having juxtaposed portions disposed in more closely spaced relation than the remaining portions of said upper wall and said upper face when said valve head is seated on said valve seat.

3. In combination, a body having a fluid inlet and a fluid outlet, said body having a chamber communicating with said inlet and said outlet, an annular valve seat disposed in registry with said fluid outlet, a movable valve structure for controlling fluid flow through said outlet, said valve structure comprising a downwardly extending axially elongated valve stem, means defining a bore for loosely guiding said valve stem for longitudinal movement, said valve stem having an enlarged lower end portion, and a valve head carried by said end portion and disposed in registry with said valve seat, means for rectilinearly translating said valve structure along its longitudinal axis, said valve head being of hollow form and having internal wall surfaces defining a central cavity communicating with an aperture of smaller cross-sectional area than said cavity, the end portion of said valve stem being loosely held captive within said cavity, said internal wall surfaces including axially spaced upper and lower walls, said end portion having upper and lower faces spaced from each other an axial distance less than the axial distance between said upper and lower walls, one of said upper wall and said upper face having a protruding axially extending portion.

4. A valve mechanism for controlling flow of a high pressure elastic fluid comprising a body, said body having an annular valve seat defining a fluid flow passage, a valve structure for controlling fluid flow through said passage, said valve structure comprising a downwardly extending axially elongated valve stem having an enlarged lower end portion, and a valve head carried by said end portion and disposed in alignment with said valve seat, means for rectilinearly translating said valve structure axially toward and away from said seat, said valve head having a central cavity and an aperture communicating therewith, said end portion being loosely held captive in said cavity, said cavity being partially defined by an upper wall portion and said end portion having an upper face portion, said upper wall and upper face portions being disposed in mutually axially spaced relation, and a pair of diametrically opposed projections disposed on one of said upper face portion and said upper wall portion, one of said projections being of greater axial height than the other.

5. A valve mechanism for controlling flow of a high pressure elastic fluid comprising a body, said body having an annular valve seat defining a fluid flow passage, a valve structure for controlling fluid flow through said passage, said valve structure comprising a downwardly extending axially elongated valve stem having an enlarged disc shaped lower end portion, and a valve head carried by said end portion and disposed in alignment with said valve seat, means for rectilinearly translating said valve structure axially into and out of engagement with said seat, said valve head having a central cavity and a central aperture communicating therewith, said end portion being loosely held captive in said cavity, said cavity being partially defined by an upper wall portion and said end portion having an upper face portion, said upper wall and upper face portions being disposed in mutually axially spaced relation, and a pair of diametrically opposed projections disposed on one of said upper face portion and said upper wall portion, one of said projections being of substantially semi-cylindrical shape and the other of said projection being of substantially hemispherical shape, said one projection being of greater height than the other.

6. A valve mechanism for controlling flow of a high pressure elastic fluid comprising a body, said body having an annular valve seat defining a fluid flow passage, a valve structure for controlling fluid flow through said passage, said valve structure comprising a downwardly extending axially elongated valve stem having an enlarged lower end portion and a valve head carried by said end portion and disposed in alignment with said valve seat, means for rectilinearly translating said valve structure axially toward and away from said seat, said valve head having a central cavity and an aperture communicating therewith, said end portion being loosely held captive in said cavity, said cavity being partially defined by an upper wall portion and said end portion having an upper face portion, said upper wall and upper face portions being disposed in mutually axially spaced relation, an axially extending projection disposed on one of said upper face portion and said upper wall portion, and a pair of externally disposed foot members attached to said valve head, said foot members being angularly disposed relative to each other and equiangularly disposed with relation to said projection, said foot members being disposed in abuttable relation with said body adjacent said valve seat.

References Cited in the file of this patent

UNITED STATES PATENTS

| | | |
|---|---|---|
| 923,616 | Benton | June 1, 1909 |
| 1,720,130 | Knupfer | July 9, 1929 |
| 2,069,069 | Horton | Jan. 26, 1937 |
| 2,228,849 | Sandos | Jan. 14, 1941 |